(12) United States Patent
Jung et al.

(10) Patent No.: US 8,429,165 B1
(45) Date of Patent: Apr. 23, 2013

(54) SYSTEMS AND METHODS OF PARTITIONING DATA FOR SYNCHRONOUS PARALLEL PROCESSING

(75) Inventors: Gueyoung Jung, Rochester, NY (US); Shanmuga-Nathan Gnanasambandam, Webster, NY (US); Tridib Mukherjee, Bangalore (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/413,978

(22) Filed: Mar. 7, 2012

(51) Int. Cl.
*G06F 17/30* (2006.01)

(52) U.S. Cl.
USPC .......................................... 707/737; 718/105

(58) Field of Classification Search ................... 707/737; 718/105
See application file for complete search history.

(56) References Cited

U.S. PATENT DOCUMENTS

| | | | |
|---|---|---|---|
| 7,003,508 B1* | 2/2006 | Shatdal | 1/1 |
| 8,281,306 B2* | 10/2012 | Logan et al. | 718/1 |
| 8,326,990 B1* | 12/2012 | Li et al. | 709/226 |
| 2010/0174714 A1* | 7/2010 | Asmundsson et al. | 707/737 |
| 2010/0199257 A1* | 8/2010 | Biggerstaff | 717/104 |
| 2010/0250742 A1* | 9/2010 | Leighton et al. | 709/224 |
| 2012/0191678 A1* | 7/2012 | Liu et al. | 707/700 |

OTHER PUBLICATIONS

Kim, et al., "Investigating the Use of Autonomic Cloudbursts for High-Throughput Medical Image Registration",Grid Computing, 2009 10th IEEE\ACM International Conference, Oct. 13-15, 2009, pp. 34-41.
Maheswaran, et al., "Dynamic Matching and Scheduling of a Class of Independent Tasks onto Heterogeneous Computing Systems", Heterogeneous Computing Workshop, 1999. (HCW '99) Proceedings. Eighth, pp. 30-44.
Kailasam, et al., "Optimizing Service Level Agreements for Autonomic Cloud Bursting Schedulers", 2010 39th International Conference on Parallel Processing Workshops, 2010 IEEE Computer Society.

* cited by examiner

*Primary Examiner* — Robert Beausoliel, Jr.
*Assistant Examiner* — Noosha Arjomandi
(74) *Attorney, Agent, or Firm* — Fox Rothschild LLP

(57) ABSTRACT

Methods and systems for partitioning data for processing in a plurality of data centers are disclosed. For each of a plurality of data centers, a time period required for the data center to process an amount of information may be estimated. The plurality of data centers may be ordered based on the time period for each data center. Data may be received from one or more sources. A data center having a smallest time period from the ordered plurality of data centers may be selected to be added to a set of data centers. An overall execution time for the set of data centers to process the data may be determined. The selecting and determining operations may be repeated until the overall execution time satisfies one or more threshold criteria. The data may be transmitted to the set of data centers.

18 Claims, 5 Drawing Sheets

SYSTEMS AND METHODS OF PARTITIONING DATA FOR SYNCHRONOUS PARALLEL PROCESSING

BACKGROUND

Episode mining or frequent pattern mining is a useful tool in various data-intensive services, such as human resource services, financial services and information technology services. Episode mining may consume significant computing resources to analyze large amount of data, particularly if the data must be analyzed within a time constraint or when requested to be performed substantially in real-time.

Infrastructure providers often have enough processing capacity to perform such data-intensive services in their own private computing clouds, but some applications with heavy logging activity, such as call centers, business chat operations, and web logs, may be hard to parallelize in real-time for analytics purposes. In such cases, using a plurality of parallelized execution environments may increase performance by distributing processing.

However, conventional methods of load balancing do not provide adequate performance. In particular, conventional load balancing techniques typically assign a substantially equal amount of data to each resource or mainly rely on the resources' data computing capacities to determine the amount of data to each resource. Moreover, existing load balancing systems cannot guarantee (and do not even attempt in many cases) that computing sub-components finish substantially in unison. As such, the slowest resource ends up lengthening the make-span for the computation.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a method of partitioning data for processing in a plurality of data centers may include estimating, for each of a plurality of data centers, a time period required for the data center to process an amount of information, ordering the plurality of data centers based on the time period for each data center, receiving data from one or more sources, selecting a data center having a smallest time period from the ordered plurality of data centers to add to a set of data centers, determining an overall execution time for the set of data centers to process the data, repeating the selecting and determining operations until the overall execution time satisfies one or more threshold criteria, and transmitting the data to the set of data centers.

In an embodiment, a system for partitioning data for processing in a plurality of data centers may include a computing device, and a non-transitory processor-readable storage medium in operable communication with the computing device. The non-transitory processor-readable storage medium may contain one or more programming instructions that, when executed, cause the computing device to estimate, for each of a plurality of data centers, a time period required for the data center to process an amount of information, order the plurality of data centers based on the time period for each data center, receive data from one or more sources, select a data center having a smallest time period from the ordered plurality of data centers to add to a set of data centers, determine an overall execution time for the set of data centers to process the data, repeat the selecting and determining operations until the overall execution time satisfies one or more threshold criteria, and transmit the data to the set of data centers.

DETAILED DESCRIPTION

Figure 1:
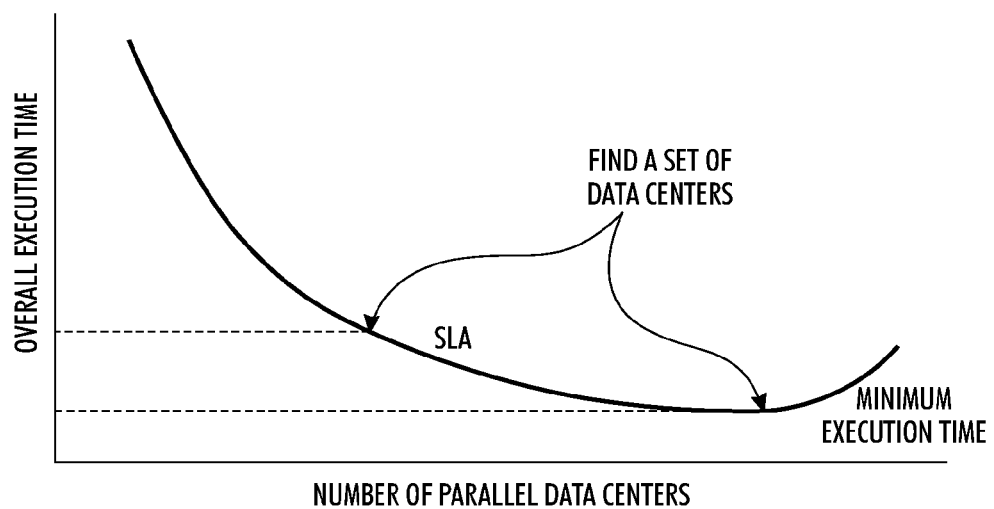
FIG. 1 depicts an illustrative graph of the overall execution time for processing data based on a number of data centers according to an embodiment.

The following terms shall have, for the purposes of this application, the respective meanings set forth below.

As used herein, the terms "sum," "product" and similar mathematical terms are construed broadly to include any method or algorithm in which a single datum is derived or calculated from a plurality of input data.

A "computation time" refers to an amount of time required to process data at a location. For example, the computation time for a unit of data may refer to the amount of time required to process the unit of data. Alternately, the computation time for partitioned data may refer to the amount of time required to process the partitioned data. A computation time may be determined for a data center and/or an individual computing device.

A "computing device" refers to a computer, a processor and/or any other component, device or system that performs one or more operations according to one or more programming instructions. An illustrative computing device is described in reference to FIG. 6.

A "data center" refers to a location having one or more computer processors. A data center may be accessible via a computer network and may be used to process data. For example, a data center may be part of a cloud-based system used to process episode mining data or other data. The data center may receive the data to be processed from a remote source or another data center.

A "data transfer delay time" refers to an amount of time required to transfer data from a first location to a second location. For example, the data transfer delay time with respect to a unit of data may refer to the amount of time required to transfer the unit of data from a first location to a second location. Alternately, the data transfer delay time with respect to partitioned data may refer to the amount of time required to transfer the partitioned data from a first location to a second location. A data transfer delay time may further include a time required to transfer return data from the second location to the first location.

"Episode mining" refers to a data analysis process by which patterns are extracted from event log files. Episode mining may extract frequent patterns (episodes), such as user behavior patterns, from an event log file that contains users' activities with a system in a temporal order. Typical event log files include web server access logs, which maintain a history of page requests from users within a time period or session, call history logs from a call center, or the like. Enterprises often desire to analyze event log files to discover valuable information, such as website traffic patterns or user activity patterns by time of day, time of week, time of year, or the like. Identified patterns may be used to generate episode rules to predict future events. In general, the event log file may be multiple orders of magnitude larger than the resulting identified patterns.

"Synchronization" refers to a process by which a plurality of data partitions are processed by remote data centers such that the processing of each data partition completes at substantially the same time.

The present disclosure pertains to methods and systems for substantially minimizing the overall execution time of an analytic, such as episode mining, by extending its execution across a plurality of computing nodes in hybrid cloud environments. In particular, when parallelizing an analytic in data centers separated by measurable latencies, a number of issues were identified in conventional load balancing techniques. In particular, conventional load balancing techniques do not enable synchronized completion across distributed data centers, consider the appropriate number of computing nodes or data centers to use and determine which data centers or computing nodes are the best ones to use, or determine appropriate data partitions for each data center in order to serialize the transmission of data to minimize the overall computation time.

The teachings of the present disclosure address these issues by describing an analytic specific heuristic bin-packing and greedy search algorithm that attempts to maximize the parallelization of episode mining by considering the time overlap across a plurality of data centers and between data transfer and data execution in each data center. As such, the disclosed systems and methods seek to reduce bottlenecking that reduces the effectiveness of conventional load balancing techniques.

The following determinations may be made to achieve substantially optimal performance of an episode mining process in a hybrid cloud environment: (1) how many data centers and computing nodes in each data center are required, where each computing node may be a cluster of servers or a rack in a data center; (2) which data centers and nodes are to be used; and (3) how the data is to be allocated to the selected data centers or nodes.

Data used for episode mining may be collected in a central location as a large data file or event log for a period of time, such as a day, week, month or year. Once the time period has elapsed, the data may be processed in the system to generate frequent episodes. In order to execute an episode mining process in a plurality of data centers for a given event log, the event log must first be partitioned and transferred to the data centers. Intuitively, as the number of nodes increases, the overall execution time will decrease, but the amount of data to be transferred from the central location increases. As shown in FIG. 1, the overall execution time may start to increase if the data is partitioned to too many data centers. This is because the data transfer delay time can dominate the overall execution time of too many data centers are used thereby increasing the overall cost. As such, the evaluation of which data centers to include in the set of data centers may be completed when this increase in overall execution time occurs (i.e., the data center that causes the overall execution time to increase is not included in the set of data centers).

Alternately, the evaluation of which data centers to include in the set of data centers may be completed when a service level agreed upon between a source of the data and an episode mining service provider is satisfied. For example, if the parties agree that the processing must be completed within an hour of the time that the data file is completed, then the evaluation of the data centers may be completed when a data center is added to the set of data centers that brings the overall execution time below one hour. Alternate and/or additional criteria for completing the evaluation may be performed within the scope of this disclosure. Methods for performing these operations are described in further detail below in reference to FIG. 2.

Figure 2:
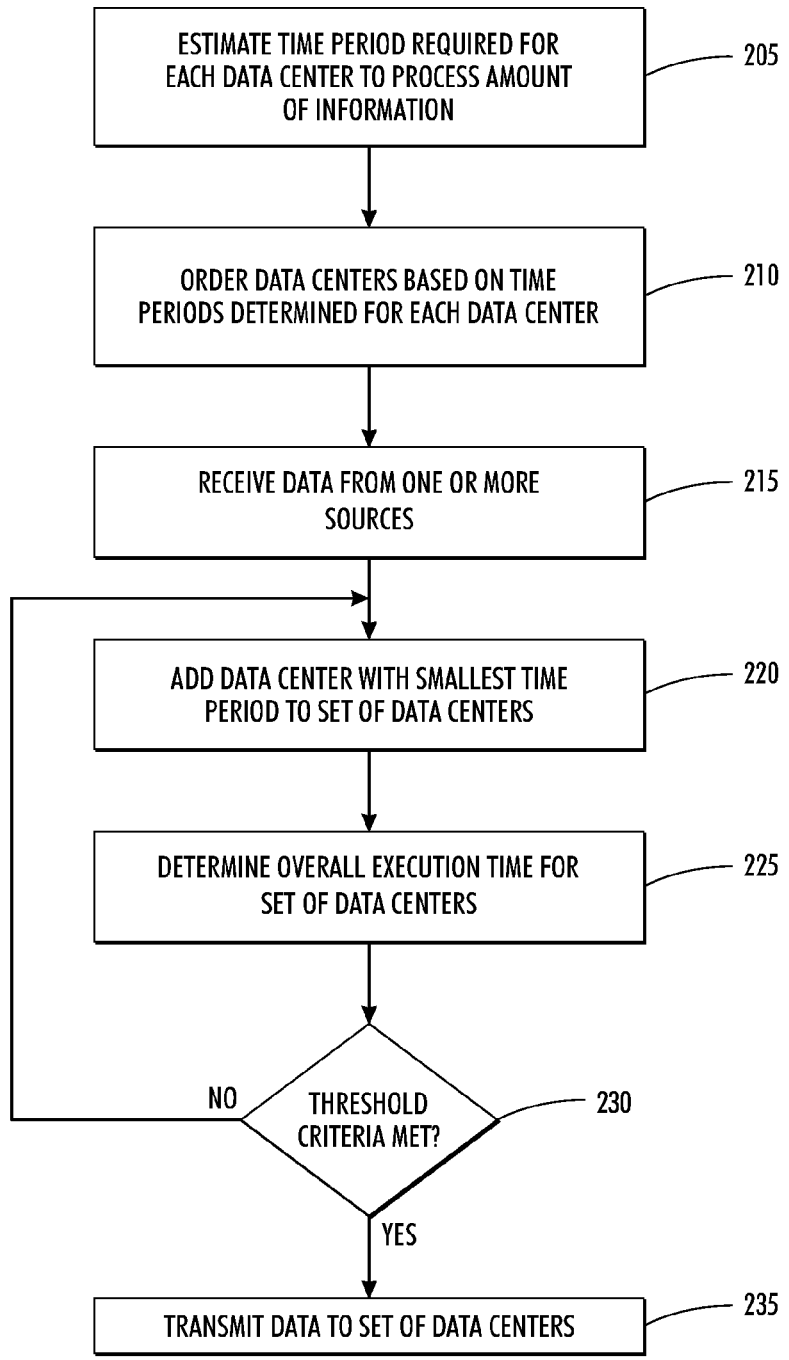
FIG. 2 depicts a flow diagram for an illustrative method of partitioning data for processing in a plurality of data centers according to an embodiment.

FIG. 2 depicts a flow diagram for an illustrative method of partitioning data for processing in a plurality of data centers according to an embodiment. As shown in FIG. 2, a computing device may estimate 205 a time period required for each of a plurality of data centers to process an amount of information. In an embodiment, the time period may be estimated 205 for each data center for transmitting an amount of data of a fixed size to each data center for processing. In an embodiment, the time period may include a computation time and a data transfer delay time.

The computation time and the data transfer delay time for a data center may each be estimated 205 using a variety of different methods. In an embodiment, the computation time for a data center may be estimated 205 by profiling the data center using a response surface model. An initial model may be created and tuned based on feedback data from episode mining operations performed by the data center over time. In an alternate embodiment, a queuing model technique may be applied in which the data center has a job queue and processes jobs taken from the queue. Feedback data regarding the processing of the data may be used to tune the model. Any estimation techniques known to one of ordinary skill in the art may be used within the scope of this disclosure to estimate 205 the computation time and the data transfer delay time for a data center.

The data transfer delay time between data centers may change more dynamically than the computation time because of factors such as last-hop latency, bandwidth congestion, re-routing due to network failures and the like. As such, estimating 205 the data transfer time may be performed using, for example and without limitation, a time-of-day model that periodically profiles the network latency between data centers and records the delay with an associated timestamp. Profiling the network latency may be performed by sending dummy data to a target data center. Using the recorded delay for the current time-of-day, the model may be constructed and tuned over time by recording an error rate between the estimated data transfer delay time and the observed data transfer delay time. Alternate and/or additional methods for estimating 205 one or more of the computation time and the data transfer delay time for a data center may also be performed within the scope of this disclosure.

The computing device may then order 210 the plurality of data centers based on the time periods determined for each data center. In an embodiment, the plurality of data centers may be ordered 210 from a data center having a smallest time period to a data center having a largest time period.

Data may then be received 215 from one or more sources. In an embodiment, the data may be received by the computing device or a separate computing device in communication with the computing device. In an embodiment, at least one of the sources may be remote from the location at which the data is received. In an embodiment, the data may comprise event log data (i.e., data for which episode mining is to be performed). Additional and/or alternate data may also be received 215 within the scope of this disclosure.

The computing device may select 220 a data center having a smallest time period from the ordered plurality of data centers that is to be added to a set of data centers to be used for parallel processing. In an embodiment, the first data center selected 220 may be a data center at which the computing device is located. However, alternate data centers may be selected as the first data center based on the time period for each data center.

Figure 3:
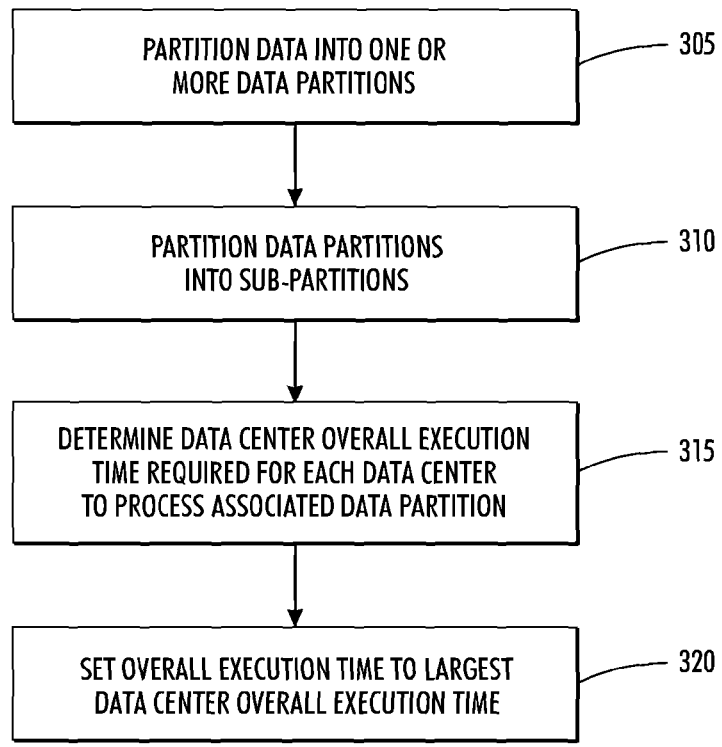
FIG. 3 depicts a flow diagram for an illustrative method of determining an overall execution time according to an embodiment.

The computing device may determine 225 an overall execution time for the set of data centers to process the data. FIG. 3 depicts a flow diagram for an illustrative method of determining an overall execution time according to an embodiment. As shown in FIG. 3, the overall execution time for the set of data centers may be determined 225 by first partitioning 305 the data into one or more data partitions. Each data partition may be associated with and/or correspond to a data center in the set of data centers. The product of the amount of data in a data partition associated with a data center and the time period for the associated data center may be substantially equal for all data centers in the set of data centers.

By dividing the event logs into partitions to be sent to one or more data centers, parallelization of data computation may occur. The size of each partition or event log assigned to each data center may be represented by as $s_i$ and the time period per unit of data for each data center may be represented as $d_i$, where each i represents a data center. As such, in order to achieve parallelization, the size of each data partition should be selected such that $$s_1 * d_1 = s_2 * d_2 = \ldots = s_n * d_n. \quad \text{(eqn. 1)}$$

If the overall execution time of the episode mining is defined as rt, then the size of the data assigned to each node would be as follows:

$$s_1 = \frac{rt}{d_i}, s_2 = \frac{rt}{d_2}, \ldots, s_n = \frac{rt}{d_n}. \quad \text{(eqn. 2)}$$

If s is the total amount of data received for processing, then $$s = s_1 + s_2 + \ldots + s_n. \quad \text{(eqn. 3)}$$

Replacing the size of the data assigned to each node results in the following equations:

$$s = \frac{rt}{d_1} + \frac{rt}{d_2} + \ldots + \frac{rt}{d_n} \quad \text{(eqn. 4)}$$

and, therefore, the optimal overall execution time for a particular set of data centers 1, 2, . . . , n would be $$rt = \frac{s}{\frac{1}{d_1} + \frac{1}{d_2} + \ldots + \frac{1}{d_n}}. \quad \text{(eqn. 5)}$$

In the above-described embodiment, each data partition may then be partitioned 310 into sub-partitions. In an embodiment, a time required for the data center associated with the data partition containing the sub-partition to process the sub-partition may be substantially equal to a time required to transfer the data for the next sub-partition to the associated data center for each sub-partition. The effect of partitioning the data partition into sub-partitions in this manner results in a complete parallelization between the computation at the data center and the data transfer from the central location to the data center.

Figure 4:
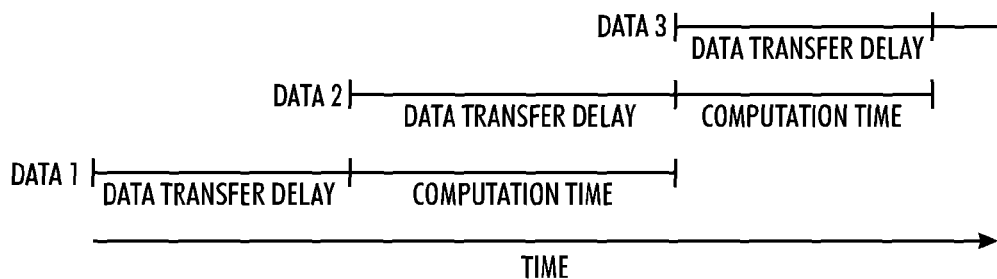
FIG. 4 depicts an illustrative graph of overlapping data transfer delay and execution times for subsequent data partitions for a data center according to an embodiment.

In other words, each data partition $s_i$ may be further partitioned into m sub-partitions $s_{i1}, s_{i2}, \ldots, s_{im}$. For each sub-partition $s_{ij}$, the time to process the sub-partition is equal to the product of the size of the sub-partition and the execution time ($e_i$) to process a unit size of data. If this value is equal to the product of the size of the next sub-partition and the data transfer delay time ($t_i$) for a unit of data, data transfer and computation are completely parallelized for the data center. This may be represented as $$s_{i(j+1)} * t_i = s_{ij} * e_i, \quad \text{(eqn. 6)}$$

for each $s_{ij}$, and is shown graphically in FIG. 4.

It is noted that if $t_i \geq e_i$, then it follows that $s_{i(j+1)} \leq s_{ij}$. Thus, the size of sub-partitions sent to a data center may decrease if the data transfer delay time is greater than the execution time. Conversely, the size of sub-partitions sent to a data center may increase if the data transfer delay time is less than the execution time.

Referring back to FIG. 3, for each data center in the set of data centers, a data center overall execution time required for the data center to process the data partition associated with the data center may be determined 315. In the above-described embodiment, the data center overall execution time may be determined using the following equation:

$$rt_{dc_i} = s_i * t_i + s_{im} * e_i \quad \text{(eqn. 7)}$$

if the data transfer of a sub-partition and the execution of a prior sub-partition are completely overlapping. It is noted that the execution of the last sub-partition at a data center does not overlap with the transfer of any subsequent sub-partition at the data center because no data remains to be transferred. Similarly, the transfer of the first sub-partition to a data center does not overlap with the execution of any sub-partition at the data center.

Once the data center overall execution times are determined for each data center, the overall execution time may be determined by setting 320 the overall execution time to the largest of the data center overall execution times. As stated above, each of the data center overall execution times would be substantially identical in the ideal case.

Figure 5:
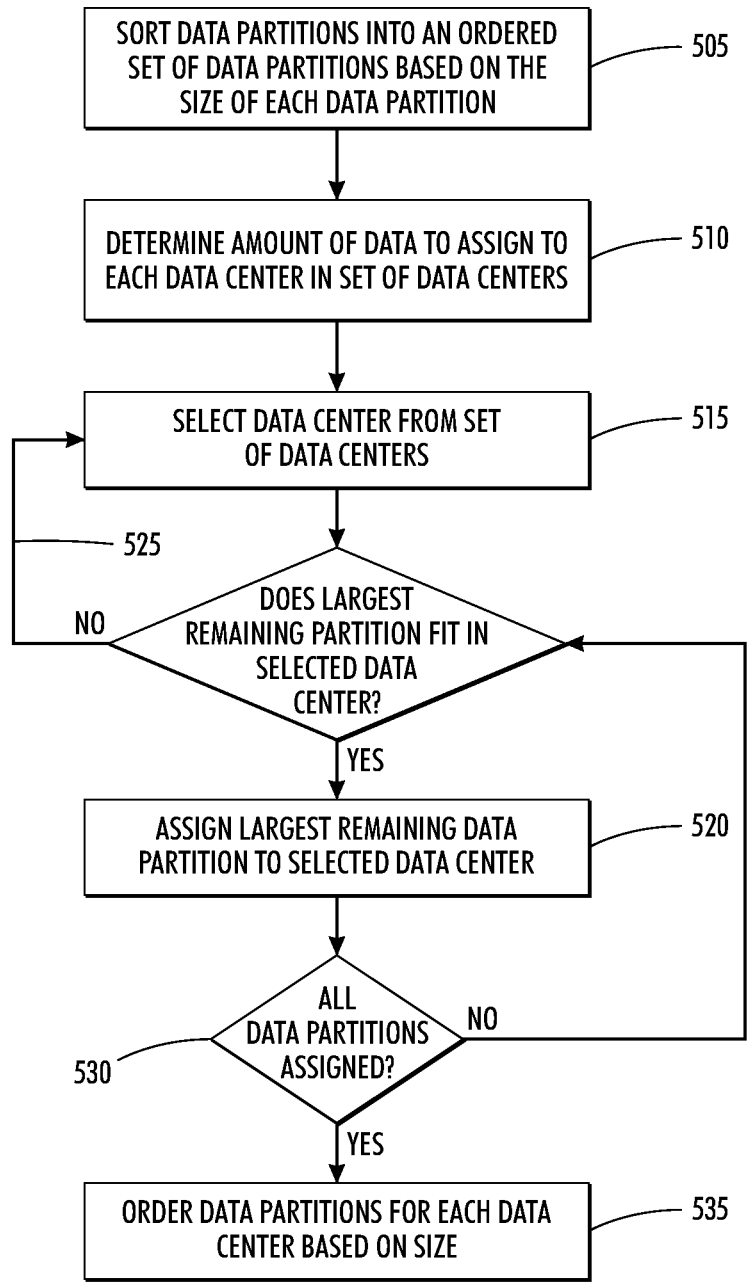
FIG. 5 depicts a flow diagram for an illustrative method of determining an overall data assignment by overlapping transfer delay and execution times according to an embodiment.

FIG. 5 depicts a flow diagram for an illustrative method of determining an overall data assignment by overlapping data transfer delay and execution times according to an embodiment. As shown in FIG. 5, if the data includes a plurality of data partitions, the overall data assignment may be determined 225 for the set of data centers by sorting 505 the plurality of data partitions into an order set of data partitions based on the size of the data partitions. For example, the ordered set of data partitions may be sorted 505 from the largest data partition to the smallest data partition. Alternate methods of sorting 505 the ordered set of data partitions may also be performed within the scope of this disclosure.

For each data center in the set of data centers, an amount of data to assign to each data center may be determined 510. Determining 510 the amount of data to assign to each data center may be done, for example, as disclosed with respect to equations (2) and (3) above.

A data center may be selected 515 from the set of data centers. In an embodiment, selecting 515 a data center may include selecting a data center from the ordered set of data centers by selecting a first remaining data center from the sorted list of data centers. In such an embodiment, the ordered list of data centers may be sorted based on the amount of data to be assigned to each data center from most to least.

The largest remaining data partition from the ordered set of data partitions may be assigned 520 to the selected data center while the difference between the amount of data assigned to the selected data center and the amount of data in the data partitions assigned to the selected data center is greater than the amount of data in the largest remaining data partition. In other words, if the sum of the amounts of data of the data partitions previously assigned to the data center and the current data partition under consideration is less than the amount of data that can be assigned to the data center, then the current data partition (i.e., the largest remaining data partition) is assigned 520 to the selected data center.

Each of the selecting 515 and assigning 520 operations may be repeated 525 for each data center. If any data partitions remain in the ordered set of data partitions, the selecting 515, assigning 520 and repeating 525 operations may be repeated 530 until all data partitions are assigned to a data center.

The data partitions assigned to each data center may be ordered 535 based on the size of the data partitions. For example, if the data transfer delay time for the data center is greater than the execution time for the data center, the data partitions may be ordered 535 from smallest to largest. Conversely, if the data transfer delay time for the data center is less than the execution time for the data center, the data partitions may be ordered 535 from largest to smallest. Ordering the data partitions in this manner may shorten the data center overall execution time for each data center.

Referring back to FIG. 2, the selecting 220 and determining 225 operations may be repeated 230 until the overall execution time satisfies one or more threshold criteria. In an embodiment, a threshold criterion may include determining whether the overall execution time for the set of data centers is greater than or equal to the overall execution time for a previously analyzed set of data centers. In such a case, increasing the number of data centers increased the overall execution time. As such, the previously analyzed set of data centers should be used to process the data in this instance.

In an alternate embodiment, a threshold criterion may include determining whether the overall execution time is less than a threshold time. For example, if the threshold time comprises an amount of time specified as a largest amount of time for processing the data, then when the total processing time is less than such a time, the processing may be initiated using the current set of data centers. Alternate and/or additional threshold criteria may be used within the scope of this disclosure.

The computing device may transmit 235 the data to the set of data centers. For example, the data may be transmitted 235 based on the ordered list of data partitions formed using the process described in reference to FIG. 5. Alternate and/or additional methods of transmitting the data may be performed within the scope of this disclosure.

Figure 6:
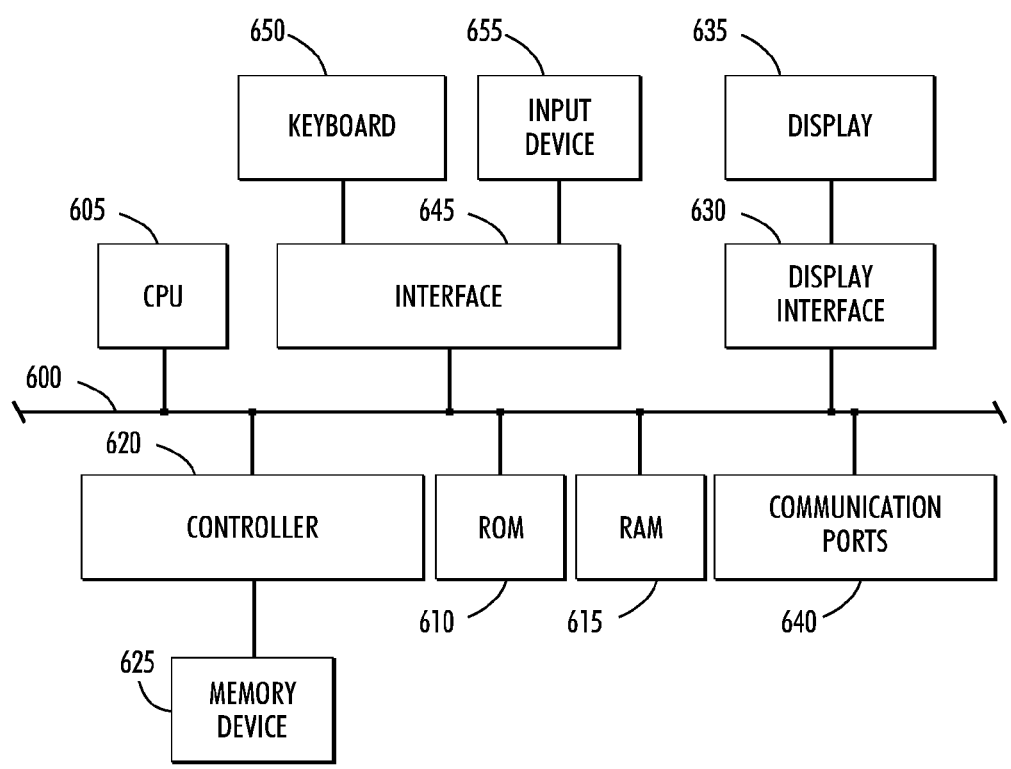
FIG. 6 depicts a block diagram of illustrative internal hardware that may be used to contain or implement program instructions according to an embodiment.

FIG. 6 depicts a block diagram of illustrative internal hardware that may be used to contain or implement program instructions, such as the process steps discussed above in reference to FIG. 2, according to embodiments. A bus 600 serves as the main information highway interconnecting the other illustrated components of the hardware. CPU 605 is the central processing unit of the system, performing calculations and logic operations required to execute a program. CPU 605, alone or in conjunction with one or more of the other elements disclosed in FIG. 6, is an illustrative processing device, computing device or processor as such terms are used within this disclosure. Read only memory (ROM) 610 and random access memory (RAM) 615 constitute illustrative memory devices (i.e., processor-readable non-transitory storage media).

A controller 620 interfaces with one or more optional memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other non-transitory storage media.

An optional display interface 630 may permit information from the bus 600 to be displayed on the display 635 in audio, visual, graphic or alphanumeric format. Communication with external devices, such as a print device, may occur using various communication ports 640. An illustrative communication port 640 may be attached to a communications network, such as the Internet or an intranet.

The hardware may also include an interface 645 which allows for receipt of data from input devices such as a keyboard 650 or other input device 655 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of partitioning data for processing in a plurality of data centers, the method comprising:

for each of a plurality of data centers, estimating, by a computing device, a time period required for the data center to process an amount of information;

ordering, by the computing device, the plurality of data centers based on the time period for each data center;

receiving data from one or more sources, wherein the data comprises at least a plurality of data partitions;

selecting, by the computing device, a data center having a smallest time period from the ordered plurality of data centers to add to a set of data centers;

determining, by the computing device, an overall execution time for the set of data centers to process the data, wherein determining the overall execution time for the set of data centers comprises:

sorting the plurality of data partitions into an ordered set of data partitions, for each data center in the set of data centers, determining an amount of the data to assign to the data center, selecting a data center from the set of data centers, assigning the largest remaining data partition from the ordered set of data partitions to the selected data center while the difference between the amount of data assigned to the selected data center and the amount of data in the data partitions assigned to the selected data center is greater than the amount of data in the largest remaining data partition, repeating the selecting and assigning operations for each data center, repeating the selecting, assigning and first repeating operations until all data partitions are assigned to a data center, and for each data center, ordering the data partitions assigned to the data center based on the size of the data partitions;

repeating the selecting and determining operations until the overall execution time satisfies one or more threshold criteria; and transmitting, by the computing device, the data to the set of data centers.

2. The method of claim 1, wherein the time period comprises a data transfer delay time and a computation time.

3. The method of claim 1, wherein ordering the plurality of data centers comprises ordering the plurality of data centers from a data center having a smallest time period to a data center having a largest time period.

4. The method of claim 1, wherein the data comprises event log data.

5. The method of claim 1, wherein determining an overall execution time for the set of data centers comprises:

partitioning the data into one or more data partitions, wherein each data partition is associated with a data center in the set of data centers, wherein the product of the amount of data in a data partition associated with a data center and the time period for the associated data center is substantially equal for all data centers in the set of data centers;

for each data partition, partitioning the data partition into sub-partitions such that, for each sub-partition, a time required for the data center associated with the data partition to process the sub-partition is substantially equal to a time required to transfer the next sub-partition to the associated data center;

for each data center in the set of data centers, determining a data center overall execution time required for the data center to process the data partition associated with the data center; and setting the overall execution time equal to a largest data center overall execution time.

6. The method of claim 1, wherein selecting a data center from the set of data centers comprises:

sorting the data centers in the set of data centers based on the amount of data to assign to each data center; and selecting a first remaining data center from the sorted list of data centers.

7. The method of claim 1, wherein repeating the selecting and determining operations comprises repeating the selecting and determining operations until the overall execution time for the set of data centers is greater than or equal to a previously determined overall execution time.

8. The method of claim 1, wherein repeating the selecting and determining operations comprises repeating the selecting and determining operations until the overall execution time is less than a threshold time.

9. The method of claim 1, wherein transmitting the data to the set of data centers comprises:

partitioning the data into one or more data partitions, wherein each data partition is associated with a data center in the set of data centers, wherein the product of the amount of data in a partition associated with a data center and the time period for the associated data center is substantially equal for all data centers in the set of data centers; and for each data partition, partitioning the data partition into sub-partitions such that, for each sub-partition, a time required for the data center to process the sub-partition is substantially equal to a time required to transfer the next sub-partition to the data center.

10. A system for partitioning data for processing in a plurality of data centers, the system comprising:

a computing device; and a non-transitory processor-readable storage medium in operable communication with the computing device, wherein the non-transitory processor-readable storage medium contains one or more programming instructions that, when executed, cause the computing device to:

for each of a plurality of data centers, estimate a time period required for the data center to process an amount of information, order the plurality of data centers based on the time period for each data center, receive data from one or more sources, wherein the data comprises at least a plurality of data partitions, select a data center having a smallest time period from the ordered plurality of data centers to add to a set of data centers, determine an overall execution time for the set of data centers to process the data, wherein the one or more programming instructions that, when executed, cause the computing device to determine an overall execution time for the set of data centers comprises one or more programming instructions that, when executed, cause the computing device to:

sort the plurality of data partitions into an ordered set of data partitions, for each data center in the set of data centers, determine an amount of the data to assign to the data center, select a data center from the set of data centers, assign the largest remaining data partition from the ordered set of data partitions to the selected data center the difference between the amount of data assigned to the selected data center and the amount of data in the data partitions assigned to the selected data center is greater than the amount of data in the largest remaining data partition, repeat the selecting and assigning operations for each data center, repeat the selecting, assigning and first repeating operations until all data partitions are assigned to a data center, and for each data center, order the data partitions assigned to the data center based on the size of the data partitions, repeat the selecting and determining operations until the overall execution time satisfies one or more threshold criteria, and transmit the data to the set of data centers.

11. The system of claim 10, wherein the time period comprises a data transfer delay time and a computation time.

12. The system of claim 10, wherein the one or more programming instructions that, when executed, cause the computing device to order the plurality of data centers comprises the one or more programming instructions that, when executed, cause the computing device to order the plurality of data centers from a data center having a smallest time period to a data center having a largest time period.

13. The system of claim 10, wherein the data comprises event log data.

14. The system of claim 10, wherein the one or more programming instructions that, when executed, cause the computing device to determine an overall execution time for the set of data centers comprises one or more programming instructions that, when executed, cause the computing device to:

partition the data into one or more data partitions, wherein each data partition is associated with a data center in the set of data centers, wherein the product of the amount of data in a data partition associated with a data center and the time period for the associated data center is substantially equal for all data centers in the set of data centers;

for each data partition, partitioning the data partition into sub-partitions such that, for each sub-partition, a time required for the data center associated with the data partition to process the sub-partition is substantially equal to a time required to transfer the next sub-partition to the associated data center;

for each data center in the set of data centers, determine a data center overall execution time required for the data center to process the data partition associated with the data center; and set the overall execution time equal to a largest data center overall execution time.

15. The system of claim 10, wherein the one or more programming instructions that, when executed, cause the computing device to select a data center from the set of data centers comprises one or more programming instructions that, when executed, cause the computing device to:

sort the data centers in the set of data centers based on the amount of data to assign to each data center; and select a first remaining data center from the sorted list of data centers.

16. The system of claim 10, wherein the one or more programming instructions that, when executed, cause the computing device to repeat the selecting and determining operations comprises one or more programming instructions that, when executed, cause the computing device to repeat the selecting and determining operations until the overall execution time for the set of data centers is greater than or equal to a previously determined overall execution time.

17. The system of claim 10, wherein the one or more programming instructions that, when executed, cause the computing device to repeat the selecting and determining operations comprises one or more programming instructions that, when executed, cause the computing device to repeat the selecting and determining operations until the overall execution time is less than a threshold time.

18. The system of claim 10, wherein the one or more programming instructions that, when executed, cause the computing device to transmit the data to the set of data centers comprises one or more programming instructions that, when executed, cause the computing device to:

partition the data into one or more data partitions, wherein each data partition is associated with a data center in the set of data centers, wherein the product of the amount of data in a partition associated with a data center and the time period for the associated data center is substantially equal for all data centers in the set of data centers; and for each data partition, partition the data partition into sub-partitions such that, for each sub-partition, a time required for the data center to process the sub-partition is substantially equal to a time required to transfer the next sub-partition to the data center.

* * * * *